United States Patent
Nanjo et al.

(10) Patent No.: US 9,802,600 B2
(45) Date of Patent: Oct. 31, 2017

(54) POWER CONTROL DEVICE AND HYBRID CONSTRUCTION MACHINE PROVIDED WITH SAME

(71) Applicants: KOBE STEEL, LTD., Kobe-shi (JP); KOBELCO CONSTRUCTION MACHINERY CO., LTD., Hiroshima-shi (JP)

(72) Inventors: Takao Nanjo, Kobe (JP); Koji Yamashita, Hiroshima (JP)

(73) Assignees: Kobe Steel, Ltd., Kobe-shi (JP); KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/914,544

(22) PCT Filed: Aug. 20, 2014

(86) PCT No.: PCT/JP2014/071773
§ 371 (c)(1),
(2) Date: Feb. 25, 2016

(87) PCT Pub. No.: WO2015/029854
PCT Pub. Date: Mar. 5, 2015

(65) Prior Publication Data
US 2016/0214597 A1    Jul. 28, 2016

(30) Foreign Application Priority Data
Aug. 27, 2013  (JP) ................. 2013-175480

(51) Int. Cl.
*B60W 10/26*  (2006.01)
*B60W 10/06*  (2006.01)
(Continued)

(52) U.S. Cl.
CPC .............. *B60W 10/26* (2013.01); *B60K 6/20* (2013.01); *B60K 6/485* (2013.01); *B60W 10/06* (2013.01);
(Continued)

(58) Field of Classification Search
CPC ...... B60W 10/26; B60W 20/10; B60W 20/00; B60W 10/06; B60K 6/20; B60K 6/485;
(Continued)

(56) References Cited

U.S. PATENT DOCUMENTS

2004/0148817 A1    8/2004  Kagoshima et al.
2011/0251746 A1*  10/2011  Wu ........................ B60K 6/48
                                                                701/22

FOREIGN PATENT DOCUMENTS

CN   103161923 A    6/2013
JP   11-224697 A    8/1999
(Continued)

OTHER PUBLICATIONS

International Search Report dated Nov. 4, 2014 in PCT/JP2014/071773 filed Aug. 20, 2014.
(Continued)

*Primary Examiner* — Brian P Sweeney
(74) *Attorney, Agent, or Firm* — Oblon, McClelland, Maier & Neustadt, L.L.P.

(57) ABSTRACT

In a power control device, when the necessary power is greater than an upper limit value and either the integral power value or the duration time of an assist provided by an electric storage device during a continuous assist by the electric storage device exceeds a predetermined first threshold value, a controller performs a first control of reducing an assist power by the electric storage device to a value smaller than an assist power for the regular control and greater than zero. Further, when the necessary power is greater than the (Continued)

upper limit value and either the integral power value or the duration time exceeds a predetermined second threshold value greater than the first threshold value, the controller performs a second control of setting the assist power to zero.

5 Claims, 7 Drawing Sheets

(51) Int. Cl.
    *B60W 20/10*     (2016.01)
    *B60K 6/20*     (2007.10)
    *B60K 6/485*     (2007.10)
    *B60W 20/00*     (2016.01)
    *H02J 7/14*     (2006.01)

(52) U.S. Cl.
    CPC ............ *B60W 20/00* (2013.01); *B60W 20/10* (2013.01); *H02J 7/1438* (2013.01); *B60Y 2200/41* (2013.01); *B60Y 2200/92* (2013.01); *B60Y 2300/91* (2013.01); *Y02T 10/7258* (2013.01); *Y10S 903/93* (2013.01)

(58) Field of Classification Search
    CPC ............... H02J 7/1438; B60Y 2200/41; B60Y 2200/92; B60Y 2300/91; Y10S 903/93; Y02T 10/7258

See application file for complete search history.

(56) References Cited

FOREIGN PATENT DOCUMENTS

| JP | 2002-238104 A | 8/2002 | |
|---|---|---|---|
| JP | 2005-330834 A | 12/2005 | |
| JP | 2006-149181 A | 6/2006 | |
| JP | 2006-149181 A1 * | 6/2006 | ........... Y02T 10/642 |
| JP | 3859982 B | 12/2006 | |
| JP | 2007-245995 A | 9/2007 | |

OTHER PUBLICATIONS

Extended European Search Report dated Aug. 2, 2016 in Patent Application No. 14840539.2.

Combined Chinese Office Action and Search Report issued May 2, 2017 in Chinese Patent Application No. 201480047499.X (with unedited computer generated English translation).

* cited by examiner

POWER CONTROL DEVICE AND HYBRID CONSTRUCTION MACHINE PROVIDED WITH SAME

TECHNICAL FIELD

The present invention relates to a power control device for a hybrid construction machine.

BACKGROUND ART

Conventionally, there are known hybrid construction machines such as the one disclosed in Patent Literature 1 which include an engine, an electric storage device, a generator for generating an electric power by a power of the engine, an actuator to be operated by a power of the engine (an electric power of the generator) and an electric power of the electric storage device, and an electric power control device for determining the allocations of an electric power necessary for the actuator between the electric storage device and the generator.

The electric power control device disclosed in Patent Literature 1 determines the electric power allocations so that the output of the engine falls within a predetermined engine output control range defined by an upper limit value and a lower limit value (by an upper limit electric power and a lower limit electric power of the generator).

Specifically, when the necessary power (electric power) for the engine is smaller than the lower limit value (the generator power lower limit value), a surplus electric power generated by the generator is charged in the electric storage device. On the other hand, when the necessary power is greater than the upper limit value (the generator power upper limit value), an electric power from the electric storage device is supplied to the actuator in addition to an electric power generated by the generator (to assist the engine while supplementing a power of the actuator).

Here, works performed by a hybrid construction machine include those performed in a relatively short period of time (for example, a dumping work using a working attachment) and those performed in a relatively long period of time (for example, a continuous (ascending) travelling and a pressing work using a working attachment).

During the work that is performed in a long period of time, a state that the necessary power for the engine exceeds the upper limit value of the engine output (the state will be hereinafter referred to as "high load state") is likely to continue for a long time.

However, in the electric regulator disclosed in Patent Literature 1, when the high load state continues for a long time, an assist provided by an electric power of the electric storage device continues for a long time, which results in a decrease of the charged rate of the electric storage device. This has been a problem.

The decrease of the charged rate of the electric storage device may cause lack of a necessary electric power during a regular control after the high load state ends.

CITATION LIST

Patent Literature

Patent Literature 1: Japanese Patent Publication No. 3859982

SUMMARY OF INVENTION

The present invention aims to provide a power control device and a hybrid construction machine including the same, the power control device being capable of causing use of an electric power of an electric storage device to assist an engine in a high load state and preventing excessive reduction of the charged rate of the electric storage device when the high load state continues for a long time.

In order to achieve the above-mentioned object, the present invention provides a power control device for a hybrid construction machine including an engine, an electric storage device, at least one actuator to be operated by at least one of a power of the engine and an electric power of the electric storage device, and a generator for generating an electric power by a power of the engine, the power control device comprising: a controller for performing a regular control of controlling charge and discharge of the electric storage device in order to keep the output of the engine within an engine output control range defined by an upper limit value and a lower limit value, the control range allowing a driving efficiency of the engine to fall within a predetermined efficiency range, by using an electric power of the electric storage device to assist the engine when the necessary power for the engine is greater than the upper limit value and driving the generator to charge the electric storage device when the necessary power is less than the lower limit value, wherein when the necessary power is greater than the upper limit value and either the integral power value or the duration time of an assist provided to the engine by the electric storage device during the continuous assist by the electric storage device exceeds a predetermined first threshold value, the controller performs a first control of reducing the assist power by the electric storage device to a value smaller than the assist power for the regular control and greater than zero, and when the necessary power is greater than the upper limit value and either the integral power value or the duration time exceeds a predetermined second threshold value greater than the first threshold value, the controller performs a second control of setting the assist power to zero.

According to the present invention, it is possible to use an electric power of an electric storage device to assist an engine in a high load state and prevent excessive reduction of the charged rate of the electric storage device when the high load state continues for a long time.

DESCRIPTION OF EMBODIMENTS

Hereinafter, an embodiment of the present invention will be described with reference to the accompanying drawings. It should be noted that the following embodiment illustrates an example of the invention, and does not limit the protection scope of the invention.

Figure 1:
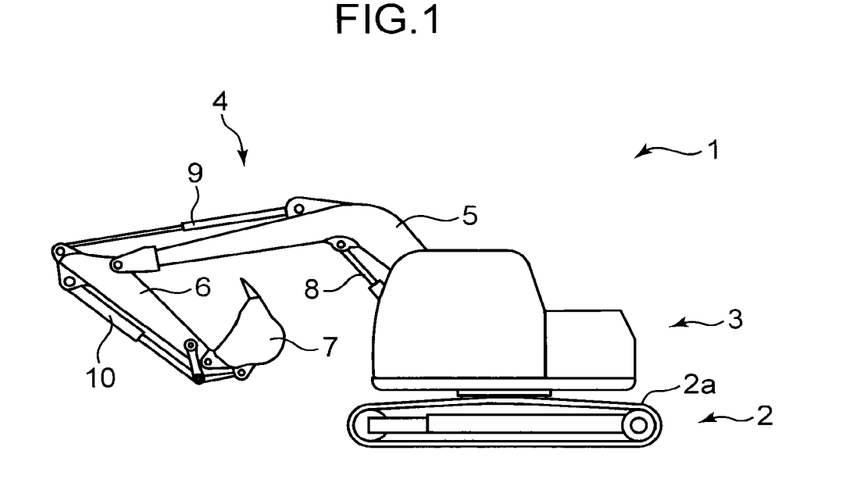
FIG. 1 is a left side view showing an overall configuration of a hybrid excavator according to an embodiment of the present invention.

With reference to FIG. 1, a hybrid excavator 1 includes a self-propelled lower travelling body 2 having a crawler 2a, an upper slewing body 3 pivotally mounted on the lower travelling body 2, a working attachment 4 actionably attached to the upper slewing body 3, a travelling motor 14 (see FIG. 2) for driving the lower travelling body 2 to travel, a slewing motor 15 (see FIG. 2) for driving the upper slewing body 3 to slew with respect to the lower travelling body 2, and a drive system 16 (see FIG. 2) for the hybrid excavator 1.

The working attachment 4 includes a boom 5 attached to the upper slewing body 3 in a raisable and lowerable manner, an arm 6 pivotally attached to a front end of the boom 5, and a bucket 7 pivotally attached to a front end of the arm 6.

Further, the working attachment 4 includes a boom cylinder 8 for raising and lowering the boom 5 with respect to the upper slewing body 3, an arm cylinder 9 for causing the arm 6 to pivot with respect to the boom 5, and a bucket cylinder 10 for causing the bucket 7 to pivot with respect to the arm 6.

Figure 2:
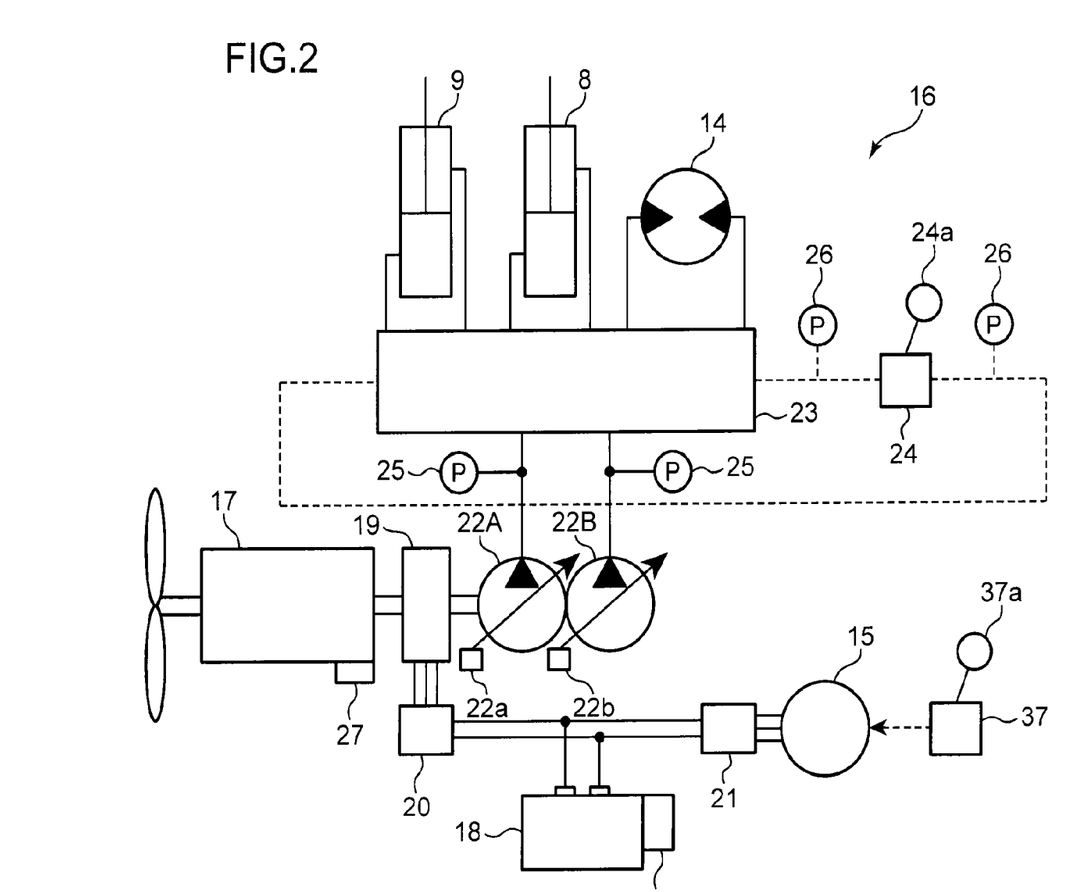
FIG. 2 is a schematic diagram of a drive system of the hybrid excavator shown in FIG. 1.

With reference to FIG. 2, the drive system 16 includes an engine 17, an electric storage device 18, a generator motor 19 connected to an output shaft of the engine 17, an engine-side inverter 20 provided between the generator motor 19 and the electric storage device 18, a slewing-side inverter 21 provided between the slewing motor 15 and the electric storage device 18, a first hydraulic pump 22A and a second hydraulic pump 22B connected to the output shaft of the engine 17, control valves 23 each of which controls the supply and discharge of hydraulic oil between each of the hydraulic pumps 22A and 22B and a hydraulic actuator, remote control valves 24 each of which generates a pilot pressure for operating a control valve 23, pump pressure sensors 25 which respectively detect discharge pressures of the hydraulic pumps 22A and 22B, operation pressure sensors 26 each of which detects a pilot pressure generated by a remote control valve 24, a slewing instruction outputter 37 which outputs a slewing instruction to the slewing motor 15, an ECU (Engine Control Unit) 27 which controls the engine speed of the engine 17, a charged state detector 28 which detects the state of charge (hereinafter also referred to as "SOC") of the electric storage device 18, and a controller 30 (see FIG. 3) which controls the power of the engine 17 and the charge and discharge of the electric storage device 18.

The generator motor 19 has a function of operating as a generator by a power of the engine 17 and a function of operating as a motor by an electric power of the electric storage device 18.

The engine-side inverter 20 controls the power that is supplied from the electric storage device 18 to at least one of the generator motor 19 and the slewing-side inverter 21, and the power that is supplied from the generator motor 19 to at least one of the electric storage device 18 and the slewing-side inverter 21.

The slewing-side inverter 21 controls the power that is supplied from at least one of the electric storage device 18 and the engine-side inverter 20 to the slewing motor 15, and the power that is supplied from the slewing motor 15 to at least one of the electric storage device 18 and the engine-side inverter 20.

In other words, the charge and discharge of the electric storage device 18 and the driving of the generator motor 19 and the slewing motor 15 are controlled by the control of the engine-side inverter 20 and the slewing-side inverter 21.

Here, the slewing motor 15 has a function of operating as a motor by an electric power of the electric storage 18 for causing the upper slewing body 3 to slew, and a function of operating as a generator by an inertial energy of the upper slewing body 3 while the slewing motion is braked.

Each of the hydraulic pumps 22A and 22B operates by a power of the engine 17 and discharges hydraulic oil. Further, the hydraulic pumps 22A and 22B are a variable displacement pump capable of regulating the discharge flow rate of hydraulic oil in response to inputs of control instructions (electric signals) into regulators 22a and 22b, respectively.

The hydraulic oil discharged from each of the hydraulic pumps 22A and 22B is supplied to the plurality of hydraulic actuators (the boom cylinder 8, the arm cylinder 9, the bucket cylinder 10, and the travelling motor 14). The discharge pressures of the hydraulic pumps 22A and 22B are respectively detected by the pump pressure sensors 25.

Further, the hydraulic oils respectively discharged from the hydraulic pumps 22A and 22B are combined before being supplied to the hydraulic actuators. On the other hand, each of the hydraulic pumps 22A and 22B may be made to supply hydraulic oil to actuators of one of groups which the plurality of actuators are divided into two or more. FIG. 2 omits illustration of the bucket cylinder 10 as a hydraulic actuator.

The control valves 23 control the supply and discharge of hydraulic oil to and from the plurality of hydraulic actuators, respectively. Specifically, each of the control valves 23 is switched according to the pilot pressure that is supplied via the corresponding remote control valve 24 in response to an operation of an operation lever 24a, to thereby control the supply and discharge of hydraulic oil to and from the corresponding hydraulic actuator. The pilot pressure supplied to the control valve 23 is detected by an operation pressure sensor 26.

It should be noted that, although FIG. 2 shows one control valve 23 and one remote control valve 24 for the purpose of simplifying the description, one control valve 23 and one remote control valve 24 are provided for each of the plurality of actuators.

The slewing instruction outputter 37 outputs an instruction (electric signal) for slewing the slewing motor 15 according to the operation amount of the operation lever 37a. The instruction outputted by the slewing instruction outputter 37 is inputted to the controller 30 described later, and the controller 30 controls the inverters 20 and 21 to thereby control the driving of the slewing motor 15.

The ECU 27 controls the output of the engine 17 according to an instruction from the controller 30 described later.

The charged state detector 28 detects information necessary for calculating the SOC (the charged rate) of the electric storage device 18. Specifically, the charged state detector 28 detects an output current, the inter-terminal voltage, and the temperature of the electric storage device 18 and outputs them to the controller 30 described later.

Figure 3:
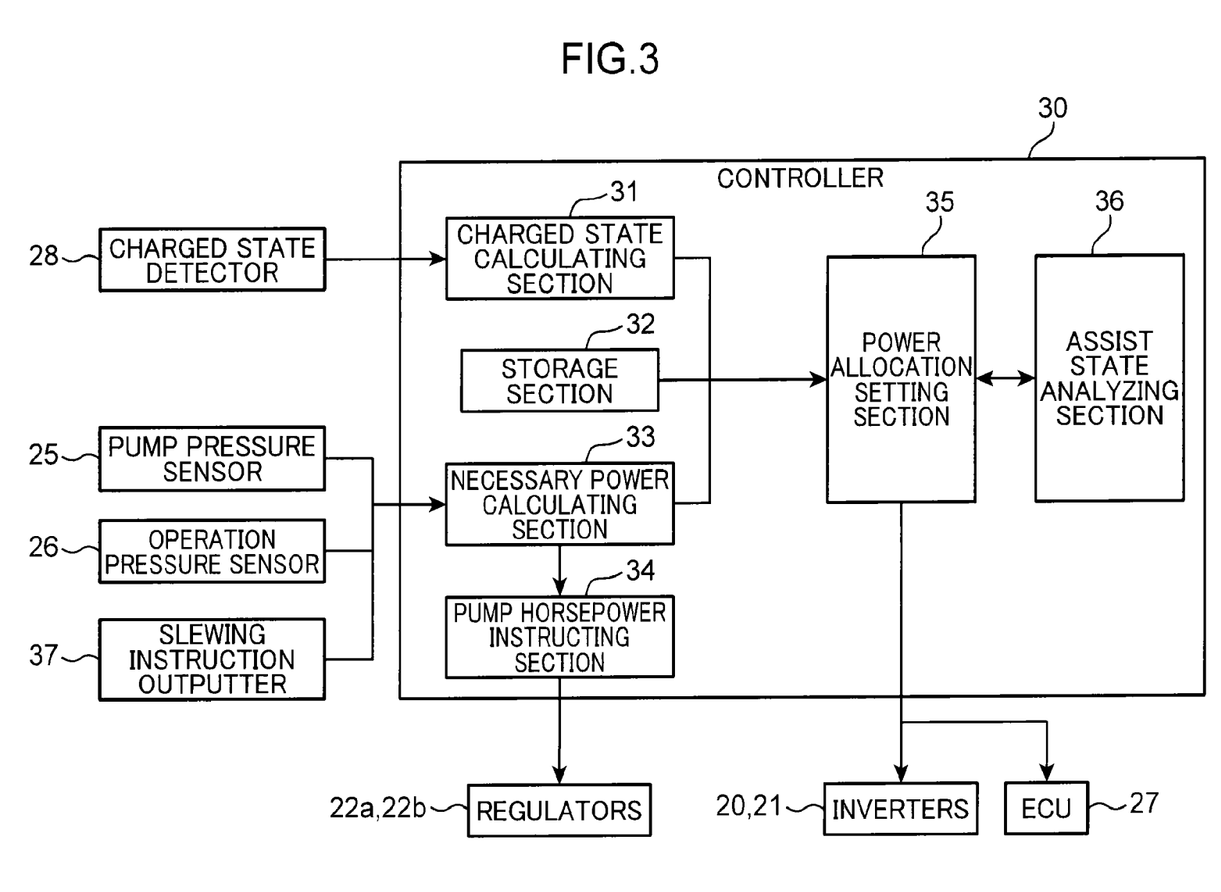
FIG. 3 is a block diagram showing an electrical configuration of the drive system shown in FIG. 2.

With reference to FIG. 3, the controller 30 includes a charged state calculating section 31 for calculating the SOC of the electric storage device 18, a storage section 32 for storing information necessary for the control, a necessary power calculating section 33 for calculating the necessary power for the engine 17, a pump horsepower instructing section 34 for outputting a horsepower instruction to each of the hydraulic pumps 22A and 22B, a power allocation setting section 35 for setting the allocations of the necessary power between the output of the engine 17 and the output of the electric storage device 18, and an assist state analyzing section 36 for analyzing the assist state of the electric storage device 18 using an electric power.

The charged state calculating section 31 calculates the SOC of the electric storage device 18 based on the output current, the inter-terminal voltage, and the temperature detected by the charged state detector 28. Because the inter-terminal voltage of the electric storage device 18 depends on the temperature, the charged state calculating section 31 corrects the inter-terminal voltage by using the temperature of the electric storage device 18. Further, the charged state calculating section 31 calculates the electric power of the electric storage device 18 based on the output current and the inter-terminal voltage of the electric storage device 18 and calculates the charge amount based on the calculated electric power. The charged state calculating section 31 calculates the ratio of the calculated charge amount to the maximum charge amount of the electric storage device 18 as the SOC.

Further, the charged state calculating section 31 calculates the maximum value $P_{bc}$ (see step S1 of FIG. 10) of the electric power chargeable in the electric storage device 18 based on the calculated SOC.

Figure 4:
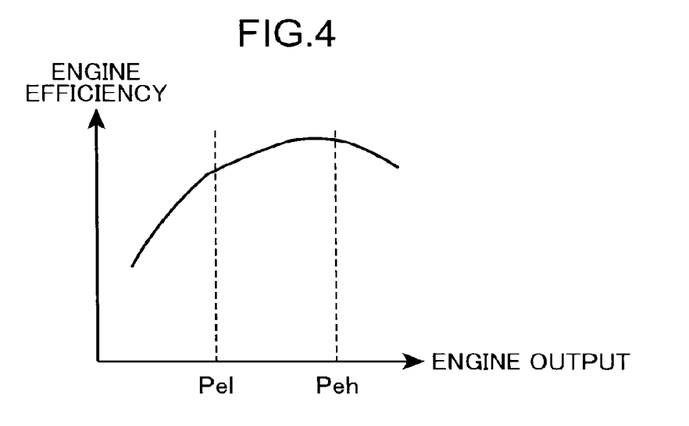
FIG. 4 is a graph showing a relationship between the output and the efficiency of an engine.

The storage section 32 stores in advance an upper limit value $P_{eh}$ and a lower limit value $P_{el}$ which define an engine output control range allowing a driving efficiency of the engine 17 to fall within a predetermined efficiency range. Here, the upper limit value $P_{eh}$ and the lower limit value $P_{el}$ are set to define the range including an engine output that produces the maximum efficiency of the engine as shown in FIG. 4, for example (an engine output at the peak of the curve indicating the maximum efficiency shown in FIG. 4).

Figure 5:
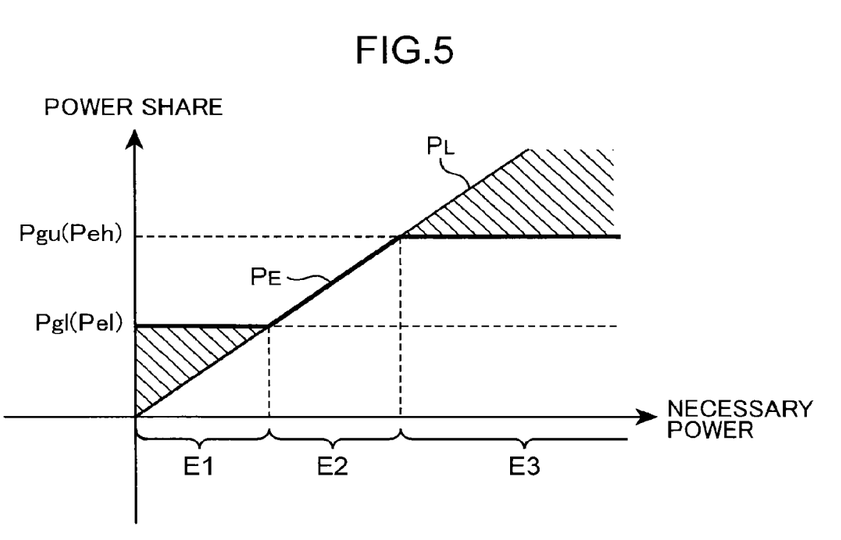
FIG. 5 is a graph showing the proportion of the necessary power shared by the engine.

The electric power conversion value of the upper limit value $P_{eh}$ of the engine output is denoted by the reference character $P_{gu}$ (as shown in FIG. 5, for example) and the electric power conversion value of the lower limit value $P_{el}$ of the engine output is denoted by the reference character $P_{gl}$ (as shown in FIG. 5, for example). These electric power upper and lower values $P_{gu}$ and $P_{gl}$ are also stored in the storage section 32.

The necessary power calculating section 33 calculates the necessary power for the engine 17, which will be described hereinafter.

The necessary power calculating section 33 calculates, as the power for the hydraulic system, the pump power by multiplying the discharge pressures and the discharge flow rates of the hydraulic pumps 22A and 22B. Here, the discharge pressures are detected by the pump pressure sensors 25. The discharge flow rates are calculated based on the operation amounts of the operation levers 24a detected by the operation pressure sensors 26. Specifically, in the case of horsepower control, the discharge flow rates are calculated based on a predetermined horsepower characteristic and the pump pressures detected by the pump pressure sensors 25, and in the case of positive control (so called "posi-con"), the discharge flow rates corresponding to the operation amounts of the operation levers 24a are specified.

Further, the necessary power calculating section 33 calculates, as the power for the electric system, the power of the slewing motor 15. Here, the power of the slewing motor 15 is calculated based on the value obtained by multiplying the rotational speed and the output torque of the slewing motor 15. The rotational speed of the slewing motor 15 can be detected by a speed sensor, for example. The output torque of the slewing motor 15 can be specified based on the value of the current supplied from the electric storage device 18 to the slewing motor 15, for example. The power of the slewing motor 15 can also be calculated by taking into account a predetermined loss of the slewing motor 15 and the slewing-side inverter 21.

Thereafter, the necessary power calculating section 33 adds the power for the hydraulic system and the power for the electric system together, and converts the obtained power into electric power, thereby calculating the necessary electric power (necessary power) $P_L$.

The power allocation setting section 35 determines the allocations of the necessary electric power $P_L$ between the power of the engine 17 and the electric power of the electric storage device 18 based on the information from the charged state calculating section 31, the storage section 32, and the necessary power calculating section 33. The power allocation setting section 35 then outputs, based on the allocations, instructions for controlling the charge and discharge of the electric storage device 18 and the output of the engine 17 to the inverters 20 and 21 and the ECU 27.

Specifically, the power allocation setting section 35 performs a regular control of controlling the charge and discharge of the electric storage device 18 so as to keep the output power (electric power) of the engine 17 between the upper limit value $P_{gu}$ and the lower limit value $P_{gl}$. Hereinafter, the regular control will be described with reference to FIG. 5. The bold line $P_E$ shown in FIG. 5 indicates the electric power conversion values of powers of the engine 17.

In the regular control, when the necessary electric power $P_L$ for the engine 17 is within the range E3 beyond the upper limit value $P_{gu}$ of the engine output, the power indicated by hatching is secured by driving of the generator motor 19 as a motor (the engine 17 is assisted by an electric power of the electric storage device 18).

On the other hand, when the necessary electric power $P_L$ is within the range E1 below the lower limit value $P_{gl}$ of the engine output, the power indicated by hatching is converted into electric power by driving of the generator motor 19 as a generator and charged in the electric storage device 18.

When the necessary electric power $P_L$ is within the range E2 defined by the upper limit value $P_{gu}$ and the lower limit value $P_{gl}$, the necessary electric power $P_L$ is secured only by an output power (electric power) $P_E$ of the engine 17 without any charge and discharge of the electric storage device 18.

Figure 6:
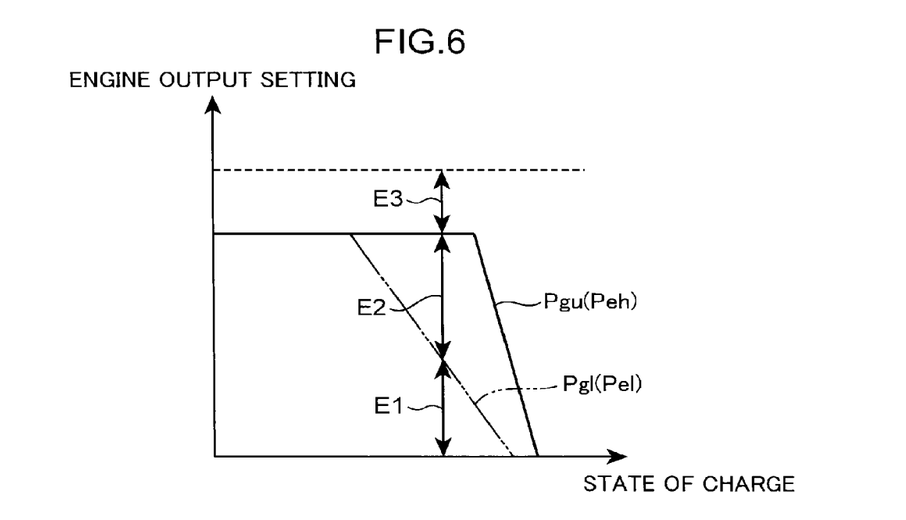
FIG. 6 is a graph showing a relationship between the engine output and the state of charge.

Here, the power allocation setting section 35 changes the lower limit value $P_{gl}$ of the engine output according to the SOC of the electric storage device 18. Specifically, the power allocation setting section 35 increases the lower limit value $P_{gl}$ as the SOC becomes smaller, as shown in FIG. 6. This makes it possible to recover the SOC quickly by increasing the charging frequency of the electric storage device 18 when the SOC becomes smaller.

Further, the power allocation setting section 35 performs a first control instead of the regular control when the necessary electric power $P_L$ is greater than the upper limit value $P_{gu}$ and the SOC of the electric storage device 18 becomes small, and performs a second control instead of the first control when the SOC becomes even smaller.

Figure 7:
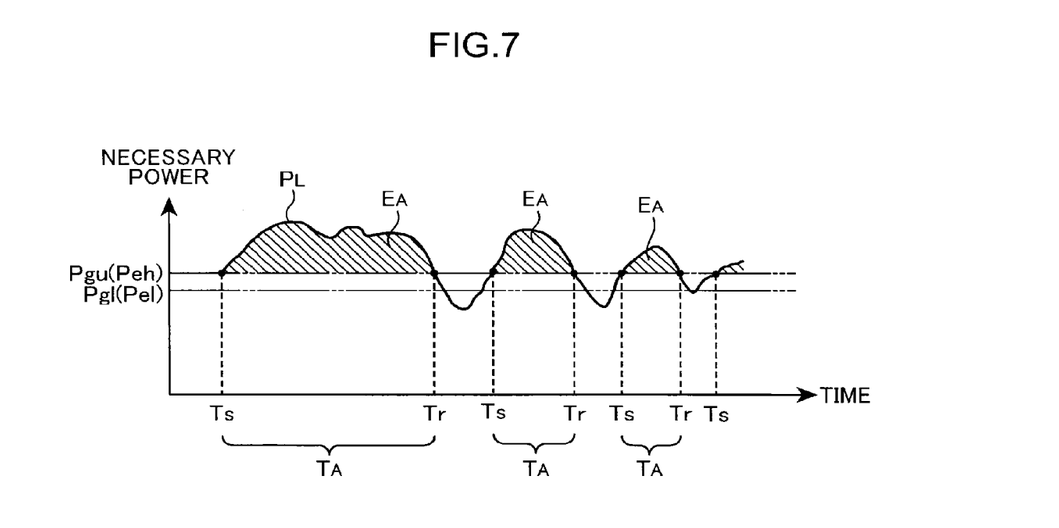
FIG. 7 is a graph showing the temporal change of the necessary power.

Here, whether the SOC becomes small is determined by the assist state analyzing section 36. Specifically, the assist state analyzing section 36 calculates the duration time $T_A$ of a continuous assist provided to the engine 17 by the electric storage device 18 using an electric power or the integral power value $E_A$ of the necessary electric power $P_L$ during the duration time $T_A$ (the period of time from the time point $T_s$ at which the necessary electric power $P_L$ exceeds the upper limit value $P_{gu}$ to the time point $T_r$ at which the necessary electric power $P_L$ falls below the upper limit value $P_{gu}$), as shown in FIG. 7.

Figure 9:
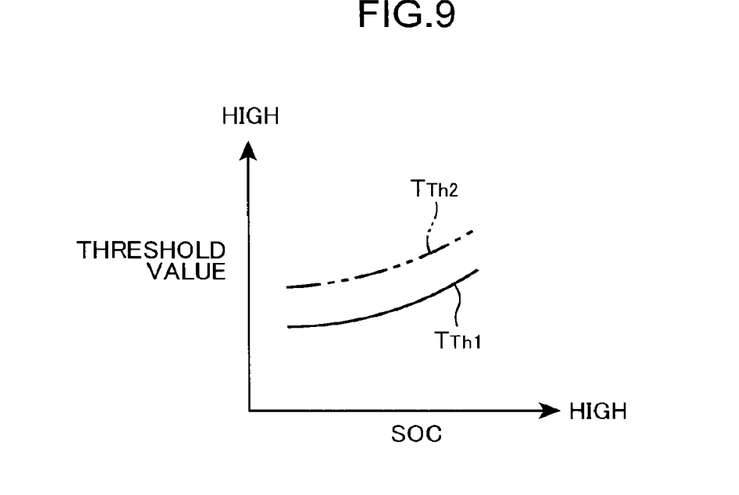
FIG. 9 is a graph showing a relationship between the first and second threshold values and the state of charge.

The power allocation setting section 35 performs the first control when the duration time $T_A$ or the integral power value $E_A$ calculated by the assist state analyzing section 36 exceeds a predetermined first threshold value $T_{Th1}$ (see FIG. 9), and performs the second control when the duration time $T_A$ or the integral power value $E_A$ exceeds a predetermined second threshold value $T_{Th2}$ (see FIG. 9). The first threshold value $T_{Th1}$ and the second threshold value $T_{Th2}$ are set for the duration time $T_A$ or the integral power value $E_A$.

Hereinafter, the first control and the second control will be generally described with reference to FIG. 8.

In the first control, the power allocation setting section 35 changes the upper limit value $P_{gu}$ of the engine output to a greater upper limit value $P_{gu1}$. Specifically, the power allocation setting section 35 sets, for the necessary electric power $P_L$, the electric power shared by the electric storage device 18 to a smaller value than in the regular control and sets the electric power (power) shared by the engine 17 to a higher value than in the regular control. This makes it possible to obtain the necessary electric power $P_L$ while suppressing the electric power consumption of the electric storage device 18.

The upper limit value $P_{gu1}$ is set to reduce the output of the electric storage device 18 to a value smaller than the output in the regular control and greater than zero.

On the other hand, in the second control, the power allocation setting section 35 changes the upper limit value $P_{gu1}$ of the engine output to a greater upper limit value $P_{gu2}$. Specifically, the power allocation setting section 35 sets, for the necessary electric power $P_L$, the electric power shared by the electric storage device 18 to zero and sets the electric power (power) shared by the engine 17 to a higher value than in the first control. In other words, in the second control, all of the necessary electric power $P_L$ is shared by the engine 17.

Here, the power allocation setting section 35 switches the regular control, the first control, and the second control in such way that the time T2 required to change the upper limit value $P_{gu1}$ to the upper limit value $P_{gu2}$ is longer than the time T1 required to change the upper limit value $P_{gu}$ to the upper limit value $P_{gu1}$.

Further, the power allocation setting section 35 changes the first threshold value $T_{Th1}$ and the second threshold value $T_{Th2}$ to smaller values as the SOC of the electric storage device 18 becomes smaller, as shown in FIG. 9. This allows the first control and the second control to be performed earlier as the SOC of the electric storage device 18 becomes smaller. Therefore, it is possible to more reliably prevent excessive reduction of the charged rate of the electric storage device 18.

Further, among the plurality of hydraulic actuators (the cylinders 8 to 10 and the travelling motor 14) of this embodiment, the travelling motor 14 (high horsepower actuator) requires a higher horsepower than the other hydraulic actuators.

Accordingly, when the operation lever 24a for the travelling motor 14 is operated, the pump horsepower instructing section 34 shown in FIG. 3 causes each of the pumps 22A and 22B to output a higher horsepower than in the case where the travelling motor 14 does not operate (the control will be hereinafter referred to as "horsepower increase control"). Specifically, the pump horsepower instructing section 34 outputs instructions to increase the discharge flow rates of the pumps 22A and 22B to the regulators 22a and 22b.

However, the increase in the horsepower of the hydraulic pumps 22A and 22B also causes increase in the necessary electric power $P_L$ for the engine 17. Consequently, the electric power of the electric storage device 18 is consumed at a higher rate.

Accordingly, when the horsepower increase control is performed, the power allocation setting section 35 sets the first threshold value $T_{Th1}$ and the second threshold value $T_{Th2}$ to lower values. This makes it possible to suppress the electric power consumption of the electric storage device 18 quickly even when the horsepower increase control is performed.

It should be noted that the hydraulic actuator that is subjected to the horsepower increase control is not limited to the travelling motor 14. For example, in the case that the working attachment 4 includes a crusher in place of the bucket 7, a hydraulic cylinder for driving the crusher to open and close its pair of blades is also subjected to the horsepower increase control.

Hereinafter, the operation performed by the controller 30 will be described with reference to FIGS. 3 to 10.

Figure 10:
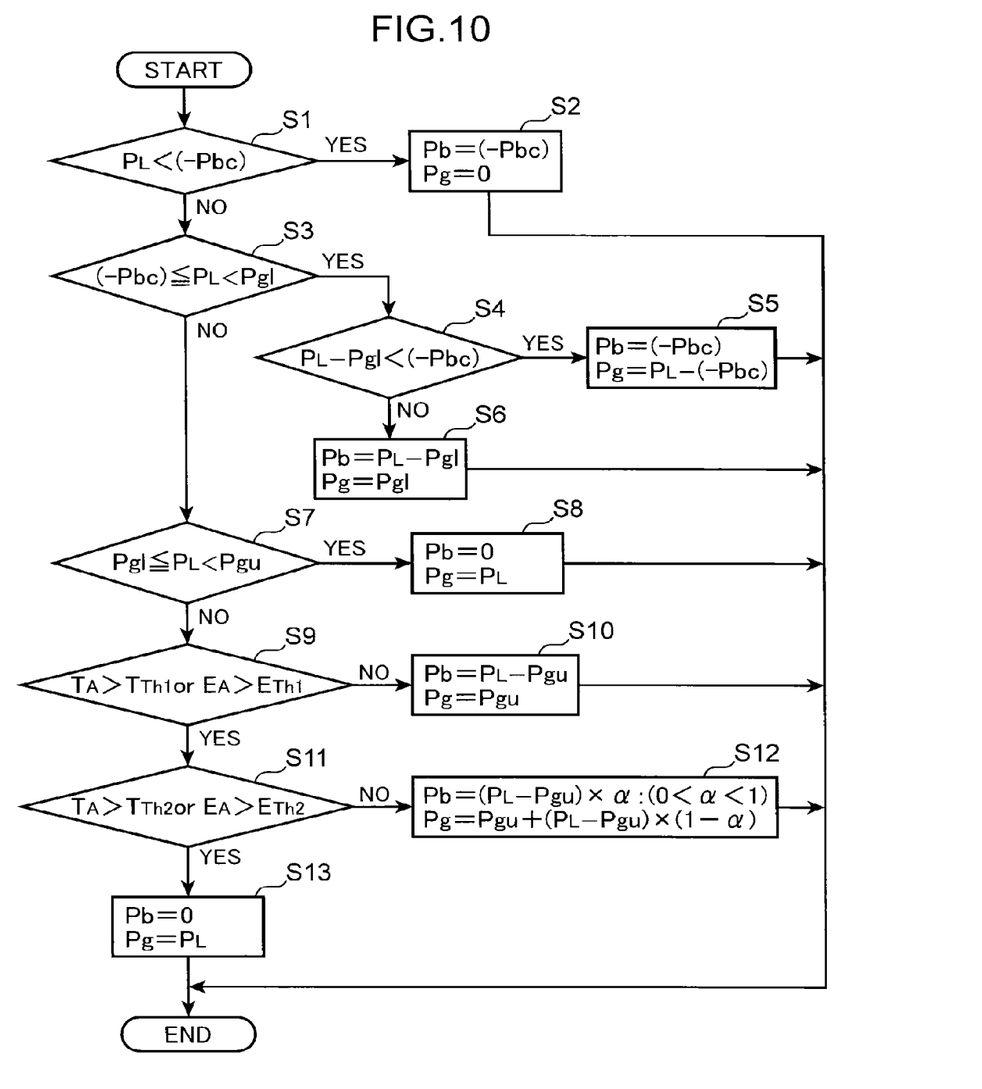
FIG. 10 is a flowchart showing the operation performed by a controller shown in FIG. 3.

Upon start of the operation, it is determined whether or not all of the necessary electric power $P_L$ is chargeable in the electric storage device 18, i.e. whether or not the necessary electric power $P_L$ is smaller than the maximum value $(-P_b)$ of the chargeable electric power (step S1).

When the slewing motor 15 operates as a generator and no power is required for the engine 17 such as in the case where only braking of the slewing motion of the upper slewing body 3 is performed, the determination is YES at step S1.

In this case, in order that the electric storage device 18 is charged with all of the necessary electric power $P_L$ and the output of the engine 17 becomes zero, a control instruction $P_b$ to the electric storage device 18 is set to the maximum chargeable electric power $(-P_{bc})$, and a control instruction $P_g$ to the engine 17 is set to zero (step S2), and these instructions are outputted to the inverters 20, 21 and the ECU 27.

On the other hand, if the determination is NO at step S1, it is determined whether or not the necessary electric power $P_L$ is smaller than the lower limit value $P_{gl}$ of the engine output (step 3). In other words, it is determined whether or not the electric storage device 18 is chargeable with the engine output being set at the lower limit value $P_{gl}$ (see the range E1 shown in FIG. 5).

If the determination is YES at step S3, it is determined whether or not all of the surplus electric power is chargeable in the electric storage device 18, the surplus electric power being a remainder of the engine output at the necessary electric power $P_L$ excluding (step S4) the lower limit value $P_{gl}$. If the determination is YES at step S4, the control instructions $P_b$ and $P_g$ are set so that the electric storage device 18 is at the maximum chargeable power $(-P_{bc})$ and the engine output is at a value $[P_L-(P_{bc})]$ obtained by subtracting the maximum chargeable power $P_{bc}$ from the necessary electric power $P_L$, and these instructions are outputted to the inverters 20, 21 and the ECU 27 (step S5).

On the other hand, if the determination is NO at step S4, the control instructions $P_b$ and $P_g$ are set so that the engine output is at the lower limit value $P_{gl}$ and the chargeable power of the electric storage device 18 equals to the surplus electric power $(P_L-P_{gl})$, and these instructions are outputted to the inverters 20, 21 and the ECU 27 (step S6).

Further, if the determination is NO at step S3, it is determined whether or not the necessary electric power $P_L$ is equal to or greater than the lower limit value $P_{gl}$ and smaller than the $P_{gu}$. In other words, it is determined whether or not the necessary electric power $P_L$ is within the range E2 shown in FIG. 5 (step S7).

If the determination is YES at step S7, the control signals $P_b$ and $P_g$ are set so that the engine output is at the necessary electric power $P_L$ and the charge/discharge electric power of the electric storage device 18 is zero, and these instructions are outputted to the inverters 20, 21 and the ECU 27 (step S8).

On the other hand, if the determination is NO at step S7, i.e. if the necessary electric power $P_L$ is determined to be equal to or greater than the upper limit value $P_{gu}$, it is determined whether or not the duration time $T_A$ or the integral power (electric power) value $E_A$ of an assist shown in FIG. 7 is greater than the first threshold value $T_{Th1}$ (step S9).

If the determination is NO at step S9, i.e. if the necessary electric power $P_L$ is determined to be equal to or greater than the upper limit value $P_{gu}$ and the duration time $T_A$ or the integral power (electric power) value $E_A$ of the assist is equal to or smaller than the first threshold value $T_{Th1}$, the following operation is performed.

The control signals $P_b$ and $P_g$ are set so that the electric power that is calculated by subtracting the upper limit value $P_{gu}$ of the engine output from the necessary electric power $P_L$ is supplemented by the electric storage device 18 and the engine output is at the upper limit value $P_{gu}$, and these instructions are outputted to the inverters 20, 21 and the ECU 27 (step S10).

On the other hand, if the determination is YES at step S9, it is determined whether or not the duration time $T_A$ or the integral power (electric power) value $E_A$ of the assist is greater than the second threshold value $T_{Th2}$ (step S11).

If the determination is NO at step S11, i.e. if the duration time $T_A$ or the integral power (electric power) value $E_A$ of the assist is greater than the first threshold value $T_{Th1}$ and equal to or smaller than the second threshold value $T_{Th2}$, the first control is performed in which the discharge electric power of the electric storage device 18 is limited as compared to step S10 (step S12). As described, step S10 is performed in the case where the duration time $T_A$ or the integral power (electric power) value $E_A$ of the assist is equal to or smaller than the first threshold value $T_{Th1}$.

In the first control, the discharge electric power of the electric storage device 18 is set to a value obtained by multiplying the discharge electric power $(P_L-P_{gu})$ set at step S10 by a coefficient $\alpha$. Here, the coefficient $\alpha$ is greater than zero and smaller than 1. Further, in the first control, the power shared by the engine 17 is increased by adding, to the engine output set at step S10, the electric power subtracted from the discharge electric power of the electric storage device 18.

At step S12, the control instructions $P_b$ and $P_g$ are set to realize such power allocations and outputted to the inverters 20, 21 and the ECU 27.

On the other hand, if the determination is YES at step S11, i.e. if the duration time $T_A$ or the integral power (electric power) value $E_A$ of the assist is determined to be greater than the second threshold value $T_{Th2}$, the second control is performed in which the discharge electric power of the electric storage device 18 is limited more than in the first control (step S13).

Specifically, in the second control, the control instructions $P_b$ and $P_g$ are set so that the discharge electric power of the electric storage device 18 is zero and the output of the engine 17 is at the necessary electric power $P_L$. In other words, in the second control, the necessary electric power $P_L$ is shared only by the engine 17. These instructions are outputted to the inverters 20, 21 and the ECU 27.

After the above-described steps S2, S5, S6, S8, S10, S12, and S13 are performed, the operation ends.

As described above, in the high load state that the necessary electric power $P_L$ for the engine 17 is greater than the upper limit value $P_{gu}$ of the engine output, it is possible to assist the engine 17 by using an electric power of the electric storage device 18.

Further, when the high load state continues (for example, in the case where a continuous ascending travel or a continuous pressing work of the working attachment is performed) and the integral power value $E_A$ or the duration time $T_A$ of an assist exceeds the first threshold value $T_{Th1}$, the assist power is reduced (and the power of engine 17 is increased to compensate for the reduction: step S12). Further, when the integral power value $E_A$ or the duration time $T_A$ of an assist exceeds the second threshold value $T_{Th2}$, the assist power is set to zero (the necessary power is secured only by the engine power: step S13).

This makes it possible to prevent excessive consumption of the electric power of the electric storage device 18 during a continuous period of the high load state. In particular, because it is possible to suppress the electric power consumption of the electric storage device 18 to zero in the state that the charge amount of the electric storage device 18 is extremely low (in the state that the integral power value $E_A$ or the duration time $T_A$ of an assist exceeds the second threshold value $T_{Th2}$), it is possible to reliably keep the charged state of the electric storage device 18.

Further, it is possible to reduce the electric power consumption of the electric storage device 18 in stages according to the magnitude of power consumption during the high load state and the duration of the high load state. Therefore, it is possible to switch the control back to the regular control quickly in the case that the high load state continues for a relatively short time (in the case that the integral power value $E_A$ or the duration time $T_A$ of an assist exceeds the first threshold value $T_{Th1}$ and then falls below the first threshold value $T_{Th1}$ immediately).

The above-described embodiment provides the following advantageous effects.

According to the above-described embodiment, each of the threshold values $T_{Th1}$ and $T_{Th2}$ is changed according to the SOC as shown in FIG. 9. This makes it possible to suppress the discharge (the assist for the engine) of the electric storage device 18 more quickly as the SOC (the charged rate) of the electric storage device 18 becomes smaller. Therefore, it is possible to prevent excessive reduction of the charged rate of the electric storage device 18 more reliably.

According to the above-described embodiment, it is possible to increase the necessary horsepowers of the hydraulic pumps 22A and 22B by setting the flow rates of the hydraulic pumps 22A and 22B to higher values when the predetermined high horsepower actuator (the travelling motor 14) operates. This makes it possible to secure the horsepower necessary for the high horsepower actuator.

Here, the consumption speed of the electric power of the electric storage device 18 increases in order to increase the output horsepowers of the hydraulic pumps 22A and 22B. However, in the above-described embodiment, the first threshold value $T_{Th1}$ and the second threshold value $T_{Th2}$ are set to low values when the high horsepower actuator operates, so that it is possible to prevent excessive reduction of the charged rate of the electric storage device 18.

Figure 8:
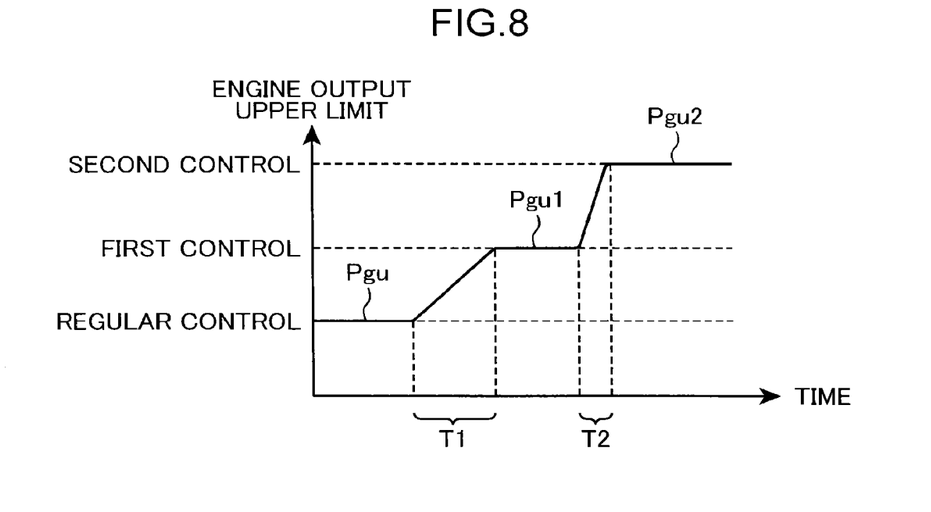
FIG. 8 is a graph showing the change in the upper limit value of the engine output between a regular control, a first control, and a second control.

According to the above-described embodiment, the switching time T1 from the regular control to the first control is longer than the switching time T2 from the first control to the second control, as shown in FIG. 8. This makes it possible to alleviate discomfort of an operator owing to the reduction of the assist power (the increase of the engine power).

On the other hand, because the switching time T2 from the first control to the second control under the condition in which the charged rate of the electric storage device 18 is lower than in a case where the regular control is switched to the first control is shorter, it is possible to stop the discharge of the electric storage device 18 quickly to thereby prevent excessive reduction of the charge amount of the electric storage device 18 more reliably.

It should be noted that, although the hybrid excavator including a hydraulic system is illustrated in the above-described embodiment, the present invention is also applicable to a hybrid excavator not including first and second hydraulic pumps 22A and 22B, and including cylinders and a travelling motor of an electric type in place of the cylinders 8 to 10 and the travelling motor 14 of a hydraulic type.

In this case, the electric cylinder and travelling motor are operated by one of an electric power of an electric storage device 18 and an electric power generated by a generator motor 19. Therefore, also in this configuration, the power for driving the actuators (the cylinders, the travelling motor and a slewing motor 15 of an electric type) is shared by an engine and the electric storage device. i.e. the engine is assisted by an electric power of the electric storage device.

The above-described specific embodiment mainly includes the invention having the following configuration.

In order to achieve the above-described object, the present invention provides a power control device for a hybrid construction machine including an engine, an electric storage device, at least one actuator to be operated by at least one of a power of the engine and an electric power of the electric storage device, and a generator for generating an electric power by a power of the engine, the power control device comprising: a controller for performing a regular control of controlling charge and discharge of the electric storage device in order to keep the output of the engine within an engine output control range defined by an upper limit value and a lower limit value, the control range allowing a driving efficiency of the engine to fall within a predetermined efficiency range, by using an electric power of the electric storage device to assist the engine when the necessary power for the engine is greater than the upper limit value and driving the generator to charge the electric storage device when the necessary power is less than the lower limit value, wherein when the necessary power is greater than the upper limit value and either the integral power value or the duration time of an assist provided to the engine by the electric storage device during the continuous assist by the electric storage device exceeds a predetermined first threshold value, the controller performs a first control of reducing the assist power by the electric storage device to a value smaller than the assist power for the regular control and greater than zero, and when the necessary power is greater than the upper limit value and either the integral power value or the duration time exceeds a predetermined second threshold value greater than the first threshold value, the controller performs a second control of setting the assist power to zero.

According to the present invention, in the high load state that the necessary power for the engine is greater than the upper limit value of the engine output, it is possible to assist the engine by using an electric power of the electric storage device.

Further, in the present invention, when the high load state continues and the integral power value or the duration time of an assist exceeds the first threshold value, the assist power is reduced (and the power of the engine is increased to compensate for the reduction). Further, when the integral power value or the duration time of an assist exceeds the second threshold value, the assist power is set to zero (the necessary power is secured only by the power of the engine.

This makes it possible to prevent excessive consumption of the electric power of the electric storage device during a continuous period of the high load state. In particular, because it is possible to suppress the electric power consumption of the electric storage device to zero in the state that the charge amount of the electric storage device is extremely low (in the state that the integral power value or the duration time of an assist exceeds the second threshold value), it is possible to reliably keep the charged state of the electric storage device.

Further, in the present invention, it is possible to reduce the electric power consumption of the electric storage device in stages according to the magnitude of power consumption during the high load state or the length of the duration time during the high load state. Therefore, it is possible to switch the control back to the regular control quickly in the case that the high load state continues for a relatively short time (in the case that the integral power value or the duration time of an assist exceeds the first threshold value and then falls below the first threshold value immediately).

In the above-described power control device, it is preferred that a charged rate detector for detecting a charged rate of the electric storage device is further included, and that the controller changes the first threshold value and the second threshold value to smaller values as the charged rate of the electric storage device detected by the charged rate detector becomes smaller.

According to this configuration, it is possible to suppress the discharge (the assist for the engine) of the electric storage device more quickly as the charged rate of the electric storage device becomes smaller. Therefore, it is possible to prevent excessive reduction of the charged rate of the electric storage device more reliably.

In the above-described power control device, it is preferred that a variable displacement hydraulic pump to be driven by the engine for supplying hydraulic fluid to a plurality of hydraulic actuators included in the at least one actuator is further included, that the generator has a function of operating as a motor by using an electric power of the electric storage device to supplement a power of the hydraulic pump to thereby assist the engine, and that in the case that among the plurality of hydraulic actuators, a high horsepower actuator that has been set to require a high horsepower operates, the controller sets a flow rate of the hydraulic pump greater and sets the first threshold value and the second threshold value smaller than in the case where only a hydraulic actuator other than the high horsepower actuator operates.

According to this configuration, it is possible, in the high load state, to cause the generator motor to operate as a motor by using an electric power of the electric storage device to supplement a power of the hydraulic pump to thereby assist the engine.

Further, according to the above-described configuration, it is possible to increase the output horsepower of the hydraulic pump by setting the flow rate of the hydraulic pump to a higher value when the predetermined high horsepower actuator operates. This makes it possible to secure the horsepower necessary for the high horsepower actuator.

Here, the consumption speed of the electric power of the electric storage device increases in order to increase the output horsepower of the hydraulic pump. However, in the above-described configuration, the first threshold value and the second threshold value are set to low values when the high horsepower actuator operates, so that it is possible to prevent excessive reduction of the charged rate of the electric storage device.

In the above-described power control device, it is preferred that the controller controls the charge and discharge of the electric storage device in such way that the switching time from the first control to the second control is shorter than the switching time from the regular control to the first control.

According to this configuration, because the switching time from the regular control to the first control is longer than the switching time from the first control to the second control, it is possible to alleviate discomfort of an operator owing to the reduction of the assist power (the increase of the engine power).

On the other hand, because the switching time from the first control to the second control under the condition in which the charged rate of the electric storage device is lower than in a case where the regular control is switched to the first control is shorter, it is possible to stop the discharge of the electric storage device quickly to thereby prevent excessive reduction of the charge amount of the electric storage device more reliably.

Further, the present invention provides a hybrid construction machine, comprising: an engine; an electric storage device; at least one actuator to be operated by at least one of a power of the engine and an electric power of the electric storage device; a generator for generating an electric power by a power of the engine; and the above-described power control device.

The invention claimed is:

1. A power control device for a hybrid construction machine including an engine, an electric storage device, at least one actuator to be operated by at least one of a power of the engine and an electric power of the electric storage device, and a generator for generating an electric power by a power of the engine, the power control device comprising:
   a controller for performing a regular control of controlling charge and discharge of the electric storage device in order to keep the output of the engine within an engine output control range defined by an upper limit value and a lower limit value, the control range allowing a driving efficiency of the engine to fall within a predetermined efficiency range, by using an electric power of the electric storage device to assist the engine when the necessary power for the engine is greater than the upper limit value and driving the generator to charge the electric storage device when the necessary power is less than the lower limit value, wherein
   when the necessary power is greater than the upper limit value and either the integral power value or the duration time of an assist provided to the engine by the electric storage device during the continuous assist by the electric storage device exceeds a predetermined first threshold value, the controller performs a first control of reducing the assist power by the electric storage device to a value smaller than the assist power for the regular control and greater than zero, and when the necessary power is greater than the upper limit value and either the integral power value or the duration time exceeds a predetermined second threshold value greater than the first threshold value, the controller performs a second control of setting the assist power to zero.

2. The power control device for the hybrid construction machine according to claim 1, further comprising a charged rate detector for detecting a charged rate of the electric storage device, wherein
   the controller changes the first threshold value and the second threshold value to smaller values as the charged rate of the electric storage device detected by the charged rate detector becomes smaller.

3. The power control device for the hybrid construction machine according to claim 1, further comprising a variable displacement hydraulic pump to be driven by the engine for supplying hydraulic fluid to a plurality of hydraulic actuators included in the at least one actuator, wherein
   the generator has a function of operating as a motor by using an electric power of the electric storage device to supplement a power of the hydraulic pump to thereby assist the engine, and
   in the case that among the plurality of hydraulic actuators, a high horsepower actuator that has been set to require a high horsepower operates, the controller sets a flow rate of the hydraulic pump greater and sets the first threshold value and the second threshold value smaller than in the case where only a hydraulic actuator other than the high horsepower actuator operates.

4. The power control device for the hybrid construction machine according to claim 1, wherein
   the controller controls the charge and discharge of the electric storage device in such way that the switching time from the first control to the second control is shorter than the switching time from the regular control to the first control.

5. A hybrid construction machine, comprising:
   an engine;
   an electric storage device;
   at least one actuator to be operated by at least one of a power of the engine and an electric power of the electric storage device;
   a generator for generating an electric power by a power of the engine; and
   a power control device comprising:
   a controller for performing a regular control of controlling charge and discharge of the electric storage device in order to keep the output of the engine within an engine output control range defined by an upper limit value and a lower limit value, the control range allowing a driving efficiency of the engine to fall within a predetermined efficiency range, by using an electric power of the electric storage device to assist the engine when the necessary power for the engine is greater than the upper limit value and driving the generator to charge the electric storage device when the necessary power is less than the lower limit value, wherein when the necessary power is greater than the upper limit value and either the integral power value or the duration time of an assist provided to the engine by the electric storage device during the continuous assist by the electric storage device exceeds a predetermined first threshold value, the controller performs a first control of reducing the assist power by the electric storage device to a value smaller than the assist power for the regular control and greater than zero, and when the necessary power is greater than the upper limit value and either the integral power value or the duration time exceeds a predetermined second threshold value greater than the first threshold value, the controller performs a second control of setting the assist power to zero.

\* \* \* \* \*